Sept. 11, 1962 T. J. WEIR 3,053,363
AIR SENSING FAN DRIVE
Filed July 31, 1959 2 Sheets-Sheet 1

INVENTOR.
THOMAS J. WEIR.
BY
Lockwood, Woodard, Smith & Weikart.
ATTORNEYS.

Sept. 11, 1962  T. J. WEIR  3,053,363
AIR SENSING FAN DRIVE
Filed July 31, 1959  2 Sheets-Sheet 2

INVENTOR.
THOMAS J. WEIR.
BY
Lockwood, Woodard, Smith + Weikart,
ATTORNEYS.

United States Patent Office 3,053,363
Patented Sept. 11, 1962

3,053,363
AIR SENSING FAN DRIVE
Thomas J. Weir, Indianapolis, Ind., assignor to Schwitzer Corporation, Indianapolis, Ind., a corporation of Indiana
Filed July 31, 1959, Ser. No. 830,906
7 Claims. (Cl. 192—58)

This invention relates generally to fluid couplings and in particular to a fluid coupling for the cooling fan of an internal combustion engine in which the torque capacity of the coupling varies with air temperature.

With the increasing use of engine accessories such as a radiator cooling fan, electric generator, power steering, pump and the like on modern automobiles, a significant portion of the power developed by the auto engine must be used to drive these accessories. Generally speaking, the power thereby consumed increases as the speed of the auto engine or driving means, but in many instances the demand for the useful output of such a driven accessory increases, if at all, at a rate which is much less.

A notable example of this condition is the radiator cooling fan. If such accessory is coupled directly to the engine, the power consumed thereby increases approximately as the cube of the engine speed. The necessary speed for the fan, as an agency for inducing heat exchanging air flow through the engine radiator, is dependent upon the operating conditions at the particular moment. These would include ambient air temperature, engine load and forward velocity. Thus it can be seen that a substantial saving in horsepower can be made by having the fan speed respond to these conditions or to a variable, such as the temperature of the air coming out of the radiator, which is a reflection of the cooling load the conditions impose.

In the case of radiator cooling fans, this can be done so that the torque transfer capacity of the coupling may be automatically increased as the temperature of the air moved by the fan increases. In other words, the rate of slippage of the coupling will be lessened as the temperature of the air moved by the fan increases, indicating either or both an increase in cooling load and an increase in ambient air temperature.

It is the primary object of the present invention to provide a coupling device which is sensitive to air temperature so that at higher temperatures the torque transfer capacity is increased.

A further object of the present invention is to provide a coupling device for an engine accessory such as a cooling fan in which slipping of the coupling may be controlled thermostatically, or otherwise, to adjust the speed of the accessory to the performance requirement which it must meet.

A further object of the present invention is to provide a coupling device of the type referred to above having means for preloading the coupling to provide a fixed minimum coupling torque capacity.

A further object of the present invention is to provide an accessory coupling which is constructed so as to facilitate the dissipation of heat generated by slippage of the coupling.

The full nature of the invention will be understood from the accompanying drawings and the following description and claims:

Figure 1:
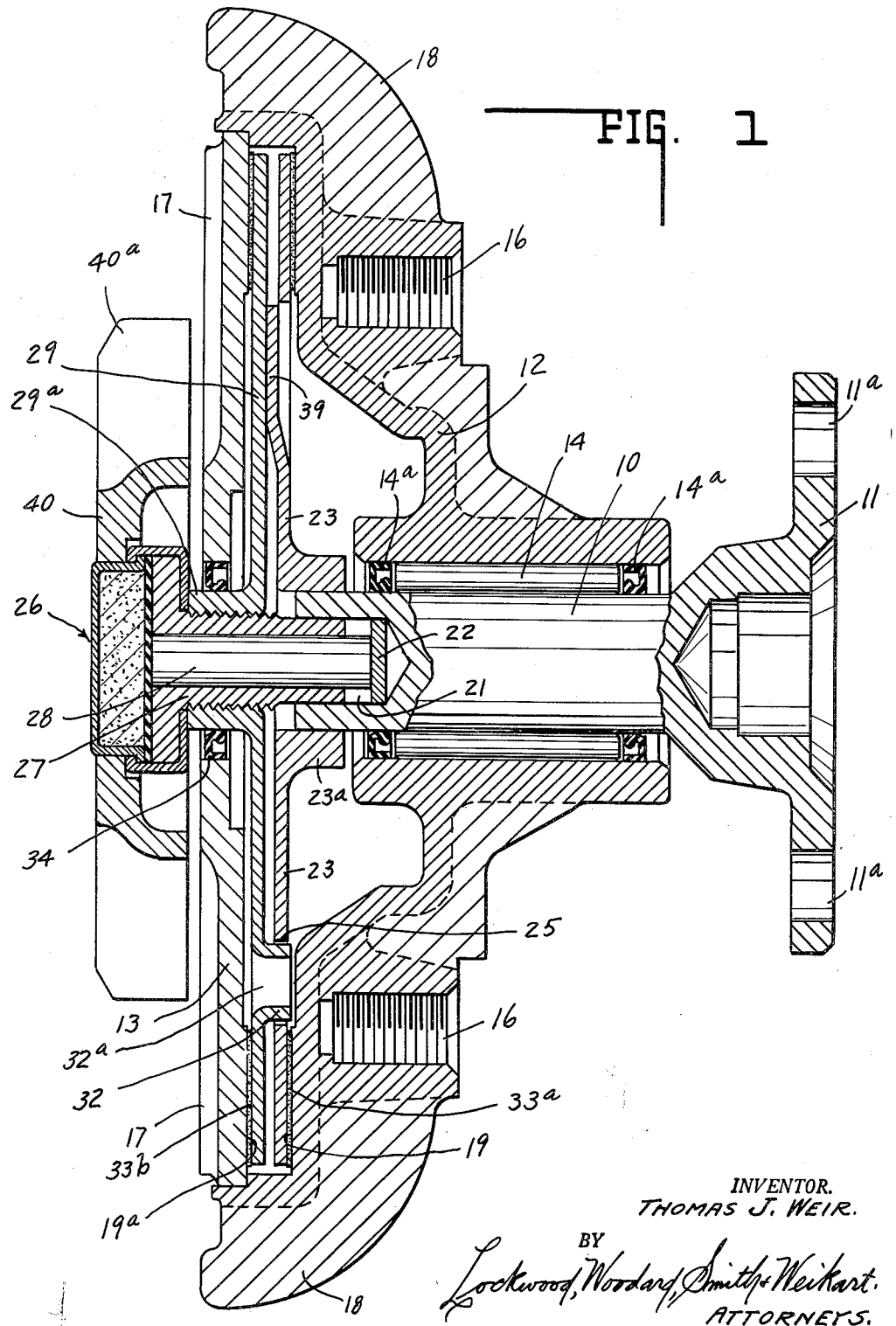
FIG. 1 is a sectional view of a coupling device embodying the present invention.
Figure 2:
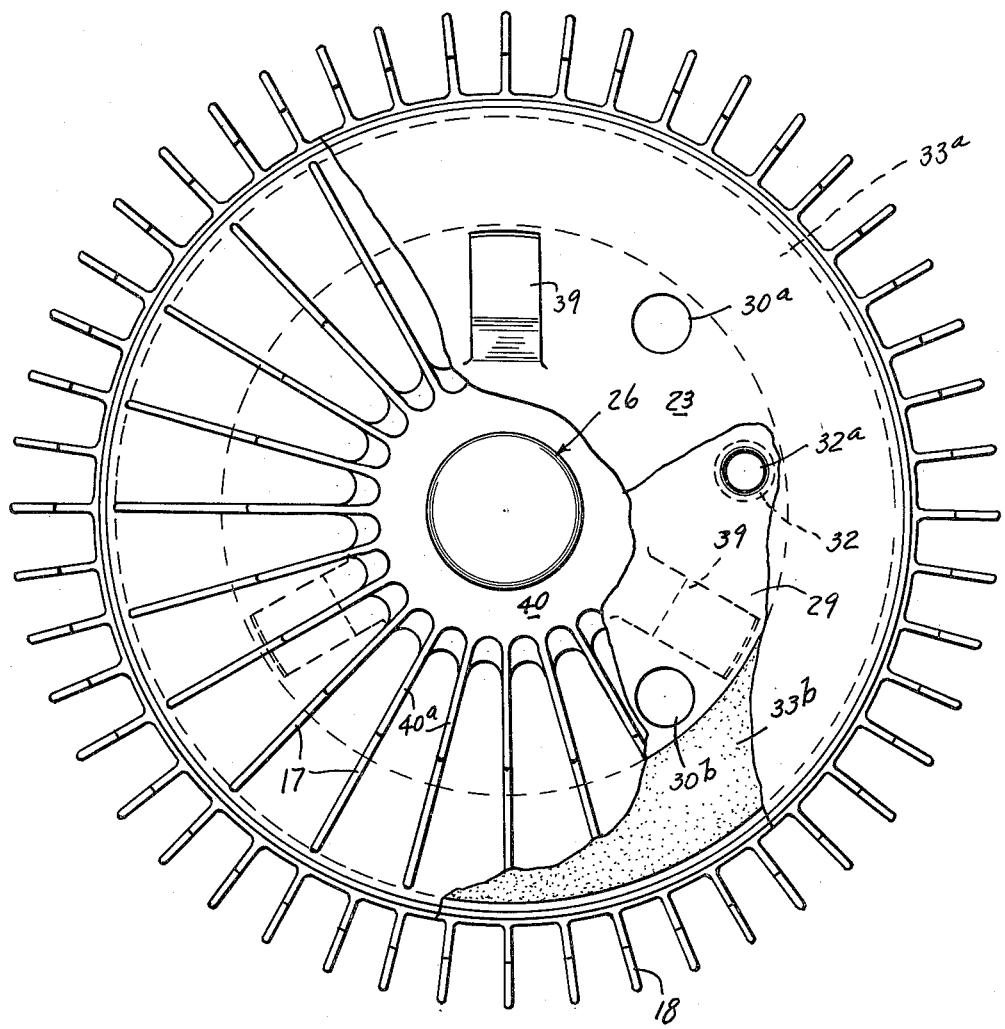
FIG. 2 is an end view of the coupling device shown in FIG. 1, with portions broken away to show the interior plates.

In my United States Patent 2,879,755 issued March 31, 1959, entitled, "Fluid Coupling Mechanism," there is disclosed and claimed a coupling device which depends upon the resistance to shearing stress of an enclosed fluid for torque transfer. Forms of the coupling device disclosed in the above mentioned patent also illustrate utilization of a condition responsive element for varying the torque transfer capacity of the coupling.

In the drawings of the present application there is illustrated, as one embodiment of the invention, a fluid coupling for driving an engine cooling fan; it should, however, be kept in mind that the coupling might be similarly utilized for transmitting torque from a source of power, such as an automobile engine, to other types of driven accessories.

Referring initially to FIG. 1, there is shown a drive shaft or spindle 10 having a flanged end 11 which has spaced apertures 11a therein, thus permitting the shaft to be bolted to a fan pulley (not shown), the fan pulley being driven in conventional fashion from the crank shaft of an automobile engine. A fluid housing comprising the cup-like section 12 and cover plate 13 is mounted by means of needle bearing 14 for free rotation about the drive shaft and for limited movement along the axis of the drive shaft. Annular seals 14a are disposed at each end of the bearing. The cup-like section is provided with a series of threaded apertures 16 which are adapted to receive bolts for securing fan blades (not shown) to the section 12, the fan blades thus rotating with the housing.

The cover plate 13 of the housing is formed with an annular series of radially-extending fins 17 for heat radiation and dissipation. The cup-shaped section 12 is also formed to provide a series of spaced peripheral fins 18 which perform the same function. The housing, including the section 12 and the cover plate 13, encompasses a fluid chamber, these members being formed to provide opposed faces 19 and 19a providing a narrowed, peripheral chamber portion.

The end of the drive shaft is provided with an axial aperture 21 and a disc 22 is bottomed in the aperture 21. A generally disc-like plate 23, having an integral hub 23a, is rigidly mounted on the drive shaft, the hub 23a having a press fit on the shaft and being thereby locked for rotation with the drive shaft.

The cover plate 13 has a central aperture therein which accommodates a portion of a temperature responsive element indicated generally at 26 in FIG. 1. The temperature responsive element may be of any desired type, but is here shown as a Vernet element, such as that disclosed in Vernet Patent 2,259,846. This type of thermally responsive element includes a sleeve 27 and a piston 28 which is extended within the sleeve upon an increase in ambient air temperature. A member 40, having fins 40a extending radially therefrom, encircles the element 26 and facilitates heat transfer to the thermal element. As may be seen in FIG. 1, the sleeve 27 extends slidably within the aperture or bore 21 in the drive shaft and the piston 28 bottoms against the disc 22.

A portion of the outer surface of the sleeve 27 is threaded to accommodate the hub 29a of a generally disc-shaped, somewhat resilient plate 29. Both the plates 23 and 29 have a diameter such that their outer surfaces extend in face-to-face relation to the housing faces 19 and 19a. The plate 29 is provided with a series of spaced apertures 32a bounded by extruded flanges 32. The extruded portions 32 formed on plate 29 extend through registering apertures 25 in plate 23 and serve to drive plate 29 with plate 23. A series of apertures 30a and 30b in plates 23 and 29, respectively, permit toroidal circulation of fluid through the void between the plates as described in my above identified patent. The outer side surfaces of plates 23 and 29 are provided with a frictional facing indicated at 33a and 33b, respectively. The material forming the facings 33a and 33b may take the form of cork, brake lining material or other substances having the desired frictional characteristics.

It will be evident from FIG. 1 that the plate 23 rotates with the drive shaft 10 because of its press fit thereon. The plate 29, since it is rotationally locked to the plate 23, is also rotated by the drive shaft. Since the plate 29, through its threaded connection to sleeve 27, carries the temperature responsive element 26, this element also rotates with the drive shaft. While the sleeve 27, and consequently plate 29 can move axially with relation to the drive shaft, the piston 28 is held against axial movement.

A fluid having suitable shear characteristics is introduced into the fluid chamber within the housing through a fill plug (not shown). Flexible seals 34 and 14a, carried by the section 12 and the cover plate 13, respectively, serve to retain the fluid in the housing. Experimental work has indicated that silicone oils of the type discussed in the General Electric Review, vol. 49, No. 11, of November, 1946, pages 14–18, "Silicone Oils, Properties and Applications" by Dr. Donald F. Wilcox, are satisfactory for use in the apparatus herein described. Other materials which maintain their shear and lubrication properties over a large range of temperatures, and which provide the necessary transmission of torque and satisfactory lubrication might also be used.

In operation, as the rotor, formed by the plates 23 and 29, is driven by the drive shaft 10, the fluid in the housing will be distributed by centrifugal force into the narrowed peripheral chamber portion defined by the faces 19 and 19a. The shearing action of the fluid between the outer side faces of the plates 23 and 29, and the housing faces 19 and 19a, will serve to transmit torque from the driven plates to the housing to provide rotation of the fan blades. As the speed of shaft 10 increases, slippage limits the torque transfer to the housing, thereby limiting the speed of the fan.

Should the temperature of the air moving past element 26 increase, indicating either or both an increased ambient air temperature and an increased cooling load, the thermally responsive element 26 acts to decrease the fluid film thickness between the plates and the housing to increase the fan speed. This action occurs because the piston 28 is axially fixed, and as the sleeve 27 is moved leftwardly, as viewed in FIG. 1, the plate 29, carrying facing 33b, is caused to come into wet clutch contact with the face 19a of the housing. Further leftward movement of the sleeve 27 displaces the housing leftwardly, as viewed in FIG. 1, along the axis of the drive shaft 10. This movement of the housing decreases the clearance between the housing face 19 and the adjacent outer side surface of the facing 33a of plate 23. Since the torque transmitting capacity of the coupling is a direct function of the clearance between the housing faces 19 and 19a and the adjacent outer side surfaces of the facings 33a and 33b of plates 23 and 29, it will be evident that the torque transmission between the plates and the housing will be increased with increased air temperature.

The movement of the sleeve 27 and consequently of the plate 29 upon a subsequent decrease in ambient temperature returns the plates and housing to their positions of FIG. 1, wherein the clearance between the housing faces and the outer side surfaces of the plate facings is again at a maximum. The position of maximum clearance referred to above defines the minimum torque transfer capacity of the coupling.

If a minimum low speed torque above this value is desired, means for preloading the coupling may be provided. This means may take the form of a series of spring members or tabs 39 which may be struck from the plate 23 and formed to extend out of the plane of the plate to be contacted by the inner side surface of the plate 29. When the spring members 39 are provided, it will be evident that as the plate 29 moves rightwardly, as viewed in FIG. 1, as a result of a decrease in air temperature, the face area 33a of the plate 23 will be urged against the face of the housing. Use of the preloading spring member causes the coupling to have a fixed torque transfer capacity not affected by changes in temperature.

It will be noted that as the thermally responsive element expands upon an increase in ambient air temperature, because of the axial movement of the housing, pressure is applied to facings of both plates 23 and 29. The pressure which is applied to the plate 29 is limited by the inherent resiliency of the material from which the plate is formed. With decreasing ambient air temperature the thermally responsive element contracts, relieving any deflection of plate 29 caused by expansion of the element. The inherent resiliency of the plate thus tends to return it and the element to its original position. The plate 29 thus acts as both an overload and a return spring. The stiffness of plate 29 may also be utilized to establish or control the top speed torque transfer of the drive. The threaded attachment of the plate 29 to the sleeve 27 permits calibration of the action of the coupling with relation to the response of the element 26.

While the invention has been disclosed and described in some detail in the drawing and foregoing description, they are to be considered as illustrative and not restrictive in character, as modifications may readily suggest themselves to persons skilled in this art and within the broad scope of the invention, reference being had to the appended claims.

The invention claimed is:

1. In a fluid coupling, the combination comprising a fluid retaining housing having spaced peripheral faces defining opposite sides of a chamber containing a supply of fluid, a drive shaft adapted to be rotated at variable speed, bearing means carried by the drive shaft and supporting said housing for rotational and axial movement with relation to said drive shaft, a pair of spaced, generally disc-shaped plates rotated by said drive shaft and disposed in said chamber with their outer side surfaces in face-to-face relation with the faces of said housing, one of said plates being shiftable in a direction parallel to the axis of said drive shaft to induce axial movement of said housing along said drive shaft, friction facing carried by the outer side surfaces of said plates, whereby upon rotation of said drive shaft torque is transferred to said housing by the shearing action of the fluid in said chamber with the torque transfer capacity being determined by the clearance between the friction facings attached to said plates and the adjacent housing faces, and means responsive to air temperature operatively connected to said one plate for shifting said one plate and consequently said housing along the axis of said drive shaft to thereby vary the clearance between friction facings attached to said plates and said housing faces and consequently the torque transfer capacity of said coupling in response to variations in ambient air temperature.

2. In a fluid coupling, the combination comprising, a fluid retaining housing having spaced peripheral faces defining opposite sides of a chamber containing a supply of fluid, a drive shaft adapted to be rotated at variable speed, bearing means carried by the drive shaft and supporting said housing for rotational and axial movement with relation to said drive shaft, a pair of spaced plates rotated by said drive shaft and disposed in said chamber with their outer side surfaces in face-to-face relation with the faces of said housing, one of said plates being shiftable in a direction parallel to the axis of said drive shaft to induce axial movement of said housing along said drive shaft, whereby upon rotation of said drive shaft torque is transferred to said housing by the shearing action of the fluid in said chamber with the torque transfer capacity being determined by the clearance between the outer side surfaces of said plates and the adjacent housing faces, and means responsive to air temperature operatively connected to said one plate for shifting said one plate and consequently said housing along the axis of said drive shaft to thereby vary the clearance between said plates and said housing faces and consequently the torque transfer capacity of said coupling in response to variations in ambient air temperature.

3. In a fluid coupling, the combination comprising a fluid retaining housing having spaced peripheral faces defining opposite sides of a chamber containing a supply of fluid, a drive shaft adapted to be rotated at variable speed, bearing means carried by the drive shaft and supporting said housing for rotational and axial movement with relation to said drive shaft, a pair of spaced plates rotated by said drive shaft and disposed in said chamber with their outer side surfaces in face-to-face relation with the faces of said housing, one of said plates being shiftable in a direction parallel to the axis of said drive shaft to induce axial movement of said housing along said drive shaft, whereby upon rotation of said drive shaft torque is transferred to said housing by the shearing action of the fluid in said chamber with the torque transfer capacity being determined by the clearance between the outer side surfaces of said plates and the adjacent housing faces, and condition responsive means operatively connected to said one plate by shifting said one plate and consequently said housing along the axis of said drive shaft to thereby vary the clearance between said plates and said housing faces and consequently the torque transfer capacity of said coupling in response to variations in said condition.

4. In a fluid coupling, the combination comprising a fluid retaining housing having spaced peripheral faces defining opposite sides of a chamber containing a supply of fluid, a drive shaft adapted to be rotated at variable speed, bearing means carried by the drive shaft and supporting said housing for rotational and axial movement with relation to said drive shaft, a pair of spaced, generally disc-shaped plates rotated by said drive shaft and disposed in said chamber with their outer side surfaces in face-to-face relation with the face of said housing, one of said plates being shiftable in a direction parallel to the axis of said drive shaft to induce axial movement of said housing along said drive shaft, friction facing carried by the outer side surfaces of said plates, whereby upon rotation of said drive shaft torque is transferred to said housing by the shearing action of the fluid in said chamber with the torque transfer capacity being determined by the clearance between the outer side surfaces of said plates and the adjacent housing faces, temperature responsive means including a member movable in response to air temperature operatively connected to said one plate for shifting said one plate and consequently said housing along the axis of said drive shaft to thereby vary the clearance between said plates and said housing faces and consequently the torque transfer capacity of said coupling in response to variations in air temperature, and means for establishing a minimum torque transfer capacity for said coupling comprising a resilient member carried by one of said plates and adapted to be engaged by the other of said plates thereby providing a force biasing said plates apart to establish a predetermined minimum, low speed torque transfer as said temperature responsive member moves through the low temperature portion of its range.

5. In a fluid coupling, the combination comprising a fluid retaining housing having spaced peripheral faces defining opposite sides of a chamber containing a supply of fluid, a drive shaft adapted to be rotated at variable speed, bearing means carried by the drive shaft and supporting said housing for rotational and axial movement with relation to said drive shaft, a pair of spaced plates rotated by said drive shaft and disposed in said chamber with their outer side surfaces in face-to-face relation with the face of said housing, one of said plates being shiftable in a direction parallel to the axis of said drive shaft to induce axial movement of said housing along said drive shaft, whereby upon rotation of said drive shaft torque is transferred to said housing by the shearing action of the fluid in said chamber with the torque transfer capacity being determined by the clearance between the outer side surfaces of said plates and the adjacent housing faces, temperature responsive means including a member movable in response to air temperature operatively connected to said one plate for shifting said one plate and consequently said housing along the axis of said drive shaft to thereby vary the clearance between said plates and said housing faces and consequently the torque transfer capacity of said coupling in response to variations in ambient air temperature, and means for establishing a minimum torque transfer capacity for said coupling comprising a resilient member carried by one of said plates and adapted to be engaged by the other of said plates thereby providing a force biasing said plates apart to establish a predetermined minimum, low speed torque transfer as said temperature responsive member moves through the low temperature portion of its range.

6. In a fluid coupling, the combination comprising a fluid retaining housing having spaced peripheral faces defining opposite sides of a chamber containing a supply of fluid, a drive shaft adapted to be rotated at variable speed, bearing means carried by the drive shaft and supporting said housing for rotational and axial movement with relation to said drive shaft, a pair of spaced plates rotated by said drive shaft and disposed in said chamber with their outer side surfaces in face-to-face relation with the face of said housing, one of said plates being shiftable in a direction parallel to the axis of said drive shaft to induce axial movement of said housing along said drive shaft, whereby upon rotation of said drive shaft torque is transferred to said housing by the shearing action of the fluid in said chamber with the torque transfer capacity being determined by the clearance between the outer side surfaces of said plates and the adjacent housing faces, condition responsive means including a member movable in response to changes in said condition operatively connected to said one plate for shifting said one plate and consequently said housing along the axis of said drive shaft to thereby vary the clearance between said plates and said housing faces and consequently the torque transfer capacity of said coupling in response to variations in said condition, and means for establishing a minimum torque transfer capacity for said coupling comprising resilient means acting between said plates to provide a fixed pressure between said plates and said housing as said conditions responsive member moves through the low end of its temperature range.

7. In a fluid coupling, the combination comprising a fluid retaining housing having spaced peripheral faces defining opposite sides of a chamber containing a supply of fluid, a drive shaft adapted to be rotated at variable speed, bearing means carried by the drive shaft and supporting said housing for rotational and axial movement with relation to said drive shaft, a pair of spaced plates rotated by said drive shaft and disposed in said chamber with their outer side surfaces in face-to-face relation with the faces of said housing, one of said plates being somewhat resilient and shiftable in a direction parallel to the axis of said drive shaft, whereby upon rotation of said drive shaft torque is transferred to said housing by the shearing action of the fluid in said chamber with the torque transfer capacity being determined by the clearance between the outer side surfaces of said plates and the adjacent housing faces, and condition responsive means operatively connected to said one plate for shifting said one plate and consequently said housing along the axis of said drive shaft to thereby vary the pressure between said plates and said housing faces and consequently the torque transfer capacity of said coupling in response to variations in said condition, the resiliency of said one plate permitting it to function both as an overload and a return spring acting against the force exerted by said condition responsive means.

References Cited in the file of this patent
UNITED STATES PATENTS

| | | |
|---|---|---|
| 2,524,389 | Lalonde | Oct. 3, 1950 |
| 2,614,396 | Rattermann | Oct. 21, 1952 |
| 2,838,244 | Oldberg | June 10, 1958 |
| 2,879,755 | Weir | Mar. 31, 1959 |